(12) United States Patent
De Bauw et al.

(10) Patent No.: US 10,352,795 B2
(45) Date of Patent: Jul. 16, 2019

(54) MEASUREMENT PROCESSING SYSTEM FOR CONDITION MONITORING OF A WIND TURBINE

(71) Applicant: Laborelec CVBA, Linkebeek (BE)

(72) Inventors: Koenraad De Bauw, Aartselaar (BE); Yann Pankow, Auderghem (BE)

(73) Assignee: LABORELEC CVBA, Linkebeek (BE)

( * ) Notice: Subject to any disclaimer, the term of this patent is extended or adjusted under 35 U.S.C. 154(b) by 551 days.

(21) Appl. No.: 14/857,908

(22) Filed: Sep. 18, 2015

(65) Prior Publication Data

US 2016/0084234 A1    Mar. 24, 2016

(30) Foreign Application Priority Data

Sep. 19, 2014    (EP) .................................... 14185526

(51) Int. Cl.
| | |
|---|---|
| *F03D 9/25* | (2016.01) |
| *G01L 5/00* | (2006.01) |
| *F03D 7/04* | (2006.01) |
| *G05B 23/02* | (2006.01) |
| *F03D 17/00* | (2016.01) |

(52) U.S. Cl.
CPC ................ *G01L 5/00* (2013.01); *F03D 7/048* (2013.01); *F03D 9/255* (2017.02); *F03D 17/00* (2016.05); *G05B 23/0283* (2013.01); *F05D 2270/331* (2013.01); *F05D 2270/332* (2013.01); *F05D 2270/335* (2013.01); *Y02E 10/72* (2013.01)

(58) Field of Classification Search
CPC ...... H02J 3/386; H02J 3/16; H02J 3/18; H02J 3/383; H02J 3/36; H02J 3/38; H02J 3/382; H02J 11/00; H02J 3/00; H02J 13/0006; H02J 2003/001; H02J 2003/003; H02J 3/12; H02J 3/14; H02J 3/1807
See application file for complete search history.

(56) References Cited

U.S. PATENT DOCUMENTS

| | | | |
|---|---|---|---|
| 2010/0308857 A1 | 12/2010 | Saniter et al. | |
| 2011/0144814 A1* | 6/2011 | Menke | F03D 7/026 700/287 |
| 2011/0313726 A1* | 12/2011 | Parthasarathy | G05B 23/024 702/179 |

(Continued)

FOREIGN PATENT DOCUMENTS

| | | |
|---|---|---|
| EP | 2 498 076 A1 | 3/2011 |
| EP | 2 684 018 B1 | 11/2014 |
| WO | 2012/123351 A1 | 9/2012 |

OTHER PUBLICATIONS

Esmaili G. Application of Advanced Power Electronics in Renewable Energy Sources and Hybrid Generating Systems, sections 3.2-3.7.2 (Year: 2006).*

(Continued)

*Primary Examiner* — Roy Y Yi
(74) *Attorney, Agent, or Firm* — Dinsmore & Shohl

(57) ABSTRACT

A measurement processing system suitable for supporting condition monitoring of a wind turbine based upon measurements performed on electrical and mechanical parts of the wind turbine, and, while determining whether the wind turbine is connected to the electrical grid or not, determining information representative for shaft torque of the wind turbine and suited for condition monitoring of the wind turbine, based on said measurements.

13 Claims, 3 Drawing Sheets

(56) References Cited

U.S. PATENT DOCUMENTS

2013/0325373 A1* 12/2013 Qiao .................. G01R 19/2509
702/58
2014/0229153 A1  8/2014 Grastein

OTHER PUBLICATIONS

Johnson, Kathryn E., Adaptive Torque Control of Variable Speed Wind Turbines, National Renewable Energy Laboratory, Aug. 2004 (Year: 2004).*

* cited by examiner

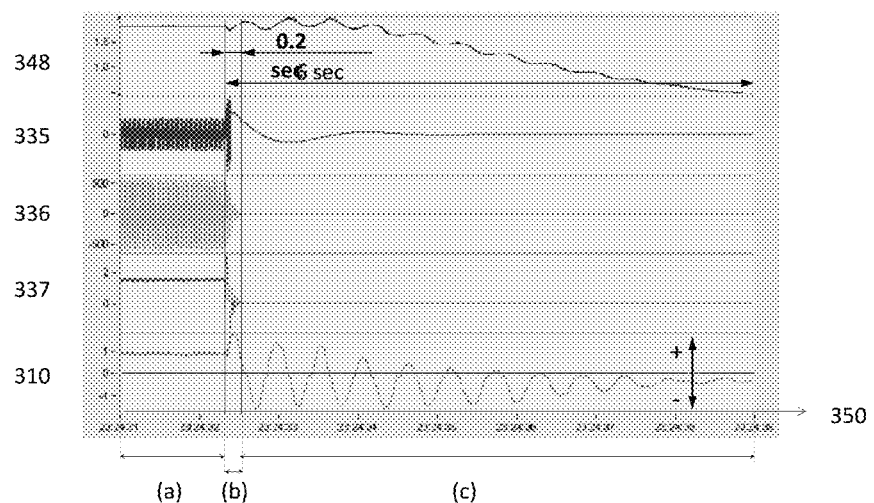
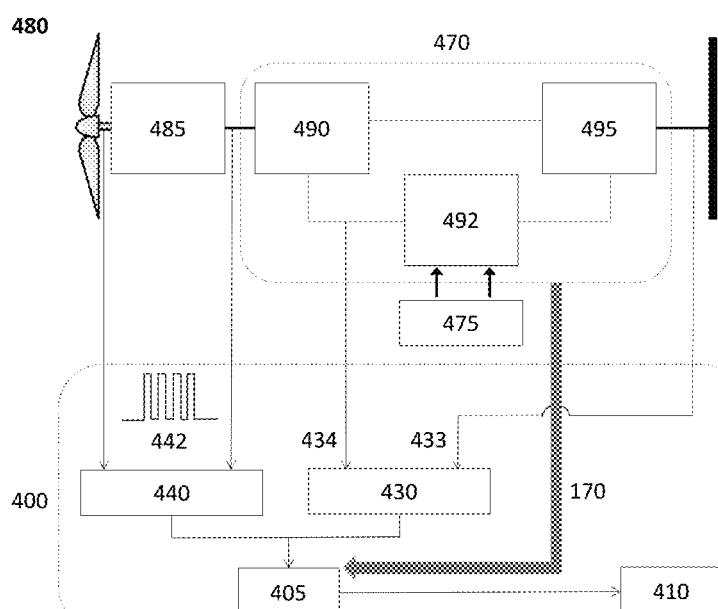

MEASUREMENT PROCESSING SYSTEM FOR CONDITION MONITORING OF A WIND TURBINE

CROSS-REFERENCE TO RELATED APPLICATIONS

This application claims priority under 35 U.S.C. § 119 to European Patent Application No. 14185526.2, filed on Sep. 19, 2014, the contents of which are hereby incorporated by reference in its entirety.

FIELD OF THE INVENTION

The invention concerns systems, methods and related software, enabling remote analysis such as condition monitoring of wind turbines, especially related to fatigue issues.

BACKGROUND OF THE INVENTION

The economic reality forces a rapid evolution of the wind energy business: upscaling of wind turbine designs, wind farms implemented in complex terrain, in limited concessions with higher power densities, off-shore installations . . . . A future challenge will also exist in the flexibility enhancement of wind farms through an increased ability to offer ancillary grid services. These evolutions imply continuous challenges for the design, operation and maintenance of wind turbines. The high and rapidly changing loads cause important stresses on the wind turbine components, that need to be accounted for in the design phase. A reliable operation and maximum availability is necessary to comply with the small economical margins related to the investments. The maintenance of the wind turbines is a particular challenge, due to the increasing costs of the hardware and the complex logistic issues linked with the interventions, especially on offshore installations.

All these challenges require powerful support tools, amongst which condition monitoring plays a prominent role, as an aid in improving the ratio between predictive and corrective maintenance. In a wind turbine, a complex interaction exists in different energy conversions: kinetic wind energy is transferred through the blades into a shaft torque on the drivetrain. The generator converts this mechanical energy into electrical energy. Actual condition monitoring approaches typically try to identify important parameters for these individual technological domains. A multidisciplinary approach is however needed in order to increase the capabilities.

An improved monitoring of the impact of load variations on the drivetrain of a wind turbine is needed. The resulting shaft torque variations have an important impact on the gearbox cogwheels and the bearings of the shaft-line components, while the electrical power variations induce thermal stresses for the electrical components. The electrical components are increasingly important in new design concepts. Due to the tendency towards a full converter technology in the shaft train design, i.e. eliminating or simplifying the gearbox section significantly, thereby enabling lighter and more robust wind turbines, more direct drive technology will occur, wherein the electrical components require heavier load. Moreover, the impact of failures of electrical components becomes even more important, considering offshore or highly remote systems.

Mechanical shaft torque variations can be measured using the input of strain gauges on the rotor or by measuring angular shaft positions as a function of time at 2 or more locations on the drivetrain of a wind turbine, as e.g. referred to in EP 2498076 A1 and EP 2684018 A1. Other techniques also exist (e.g. magnetostrictive sensors), but are still considered as less robust or less applicable in a generic way.

The use of strain gauges is the most complete measurement because it gives an indication of both the cause (shaft torque variations) and the effect (strain) of load variations. They are however expensive to install and maintain, and not robust for a permanent use, unless they would be embedded in the design of the shaft train. A calibration of the measurements with actual load (e.g. electrical measurements) is needed if one wants to use them as an absolute indicator of shaft torque.

An accurate measurement of angular shaft positions as a function of time on 2 or more locations on the shaft train enables a more robust and cost effective measurement of shaft torque variations. The input is determined by pulses generated by shaft encoders or toothed wheels. Instantaneous variations of the angular shaft position at the measurement locations cause variations of the pulse spacing in each pulse train signal. A detailed data processing enables a qualitative assessment of both the dynamic and static components of shaft torque variations. Here also, a calibration with another measurement technique (e.g. electrical measurements) is required for a more quantitative assessment. The main disadvantage of angular shaft position variation measurements is the high speed data sampling, requiring specific measurement technology, and the consecutive need for high data storage volumes if one wants to calculate the angular shaft position variations through post-analysis.

Electrical measurements (currents and voltages measured at the generator) are another way of evaluating load variations on the shaft train. These measurements have the advantage of being available in most standard measurement setups and also facilitate an easy scaling of dynamic load variations with respect to static loads. The resulting shaft torque variations on the generator shaft can be deduced by using a theoretical model of the electrical energy conversion chain, i.e. the combination of the generator and the electrical power converter. The variation of the generator shaft torque is representative for the variation on the complete shaft train for a gearless wind turbine configuration or if one disregards the torque losses in the gearbox (which is an acceptable assumption if one is interested in the relative magnitude of the peak shaft torque with respect to nominal torque). Electrical measurements have however the important disadvantage to be unavailable when the coupling with the grid is opened, as is the case during many important transients (e.g. an emergency stop). Unfortunately, there is a particular interest of capturing load variations in such situations, in order to assess their impact on the lifetime of the drivetrain components of a wind turbine.

AIM OF THE INVENTION

With this invention, we aim at an improved assessment of the impact of load variations on the drivetrain of a wind turbine.

SUMMARY OF THE INVENTION

In a first aspect of the invention, a measurement processing system is provided, suitable for supporting condition monitoring of a wind turbine, comprising: (i) means or a module, e.g. an input device or input interface, for inputting measurements performed on at least one electrical part of the wind turbine; (ii) means or a module, e.g. an input device or input interface, for inputting measurements performed on at least one mechanical part of the wind turbine; (iii) means or a module, e.g. a measurement signal or control signal interface, for determining whether the wind turbine is connected to the electrical grid or not; and (iv) computation means or a module, e.g. a computer, adapted for determining information representative for shaft torque of the wind turbine and suited for condition monitoring of the wind turbine, based on said measurements; wherein the determining of such information takes into account whether the wind turbine is connected to the electrical grid or not.

According to an embodiment of the present invention, the condition monitoring performed with this measurement processing system is related to fatigue issues of one or more of the parts of the wind turbine.

The measurement processing system according to the present invention, may also comprise means or a module, e.g. an input device or input interface, for inputting process signals, wherein the computation means or a module, e.g. a computer, are further adapted for using such process signals.

In addition, the measurement processing system according to the present invention, may comprise means or a module, e.g. an input device or input interface, for inputting on-board control information that is used in the process control of the wind turbine but is not available as a process signal, wherein the computation means or a module, e.g. a computer, are further adapted for using such on-board control information.

In an embodiment of the invention, the computation means or a module, e.g. a computer, of the measurement processing system according to the present invention are adapted for determining shaft torque of the wind turbine from measurements performed on at least one electrical part of the wind turbine by use of an analytical model of at least a part of the wind turbine. Moreover, this measurement processing system may further comprise means or a module, e.g. a processor for loading a model suitable for the wind turbine on which the measurement processing system is used.

In a second aspect of the invention, a wind turbine is provided with condition monitoring capabilities, comprising: (i) mechanical parts provided with first measurement equipment thereon; (ii) a converting system provided with second measurement equipment thereon and connected to said mechanical parts; (iii) a measurement processing system according to a first aspect of the invention, inputting measurements provided by said first measurement equipment and inputting measurements provided by said second measurement equipment. The converting system mentioned, is defined as a conversion system between mechanical and electrical energy, more specifically a system converting mechanical energy into electrical energy.

According to an embodiment of the present invention, the first measurement equipment of the wind turbine described above is adapted for being operable irrespectively of whether the wind turbine is connected to the electrical grid or not. In addition, the first measurement equipment of the wind turbine according to the present invention, can measure angular shaft positions of a wind turbine shaft as a function of time.

In a third aspect of the invention, a method is provided for determining information representative for shaft torque of the wind turbine and suited for condition monitoring of a wind turbine, comprising the steps of (i) determining shaft torque of the wind turbine from measurements performed on the converting system of the wind turbine by use of a model of at least a part of the wind turbine if such measurements are available; and otherwise (ii) determining shaft torque of the wind turbine from measurements performed on at least one of the mechanical parts of the wind turbine. The measurements performed on at least one of the mechanical parts of the wind turbine, using the method described above according to third aspect of the invention, may be angular shaft positions of a wind turbine shaft as a function of time.

In a fourth aspect of the invention, a computer program product, as well as a non-transitory machine-readable digital data storage medium for storing such computer program product are also provided. It is understood that a computer is interpreted here in its broadest sense, i.e. as a device or system that can be programmed to carry out operations (semi) automatically.

In a fifth aspect of the invention, the use for condition monitoring of a wind turbine is provided, based upon measurements performed on the converting system of the wind turbine and measurements performed on at least one of the mechanical parts of the wind turbine; whereby such use selectively comprises one of said measurements depending whether the wind turbine is connected to the electrical grid or not.

Moreover, the measurements for this use according to the present invention are possibly selected for determining information representative for shaft torque of the wind turbine and suited for condition monitoring of the wind turbine.

In a sixth aspect of the invention, a measurement processing system is provided, suitable for supporting (condition) monitoring of a wind turbine, comprising (i) means or a module, e.g. an input device or input interface, for inputting measurements performed on at least one part of the wind turbine; (ii) means or a module, e.g. a signal interface, for determining the operational mode of the wind turbine; and (iii) computation means or a module, e.g. a computer, adapted for determining information representative for shaft torque of the wind turbine and suited for (condition) monitoring of a part of the wind turbine, based on said measurements; whereby the determining of such information takes into account the operational mode of the wind turbine.

In a seventh aspect of the invention, a measurement processing system is provided, suitable for supporting (condition) monitoring of a wind turbine, comprising (i) means or a module, e.g. an input device or input interface, for inputting measurements performed on at least one part of the wind turbine; (ii) computation means or a module, e.g. a computer, adapted for determining information representative for thermal stress in at least one part of the wind turbine and suited for condition monitoring of the wind turbine, based on said measurements.

BRIEF DESCRIPTION OF DRAWINGS

FIG. 3 shows a detailed evolution of electrical and mechanical measurements, including generator shaft torque before (a), during (b) and just after (c) the emergency stop of a wind turbine, in accordance with the present invention.

FIG. 4 shows schematically the overall system of the wind turbine and the measurement processing system connected thereto for condition monitoring of a wind turbine in accordance with the present invention.

DETAILED DESCRIPTION

Figure 1:
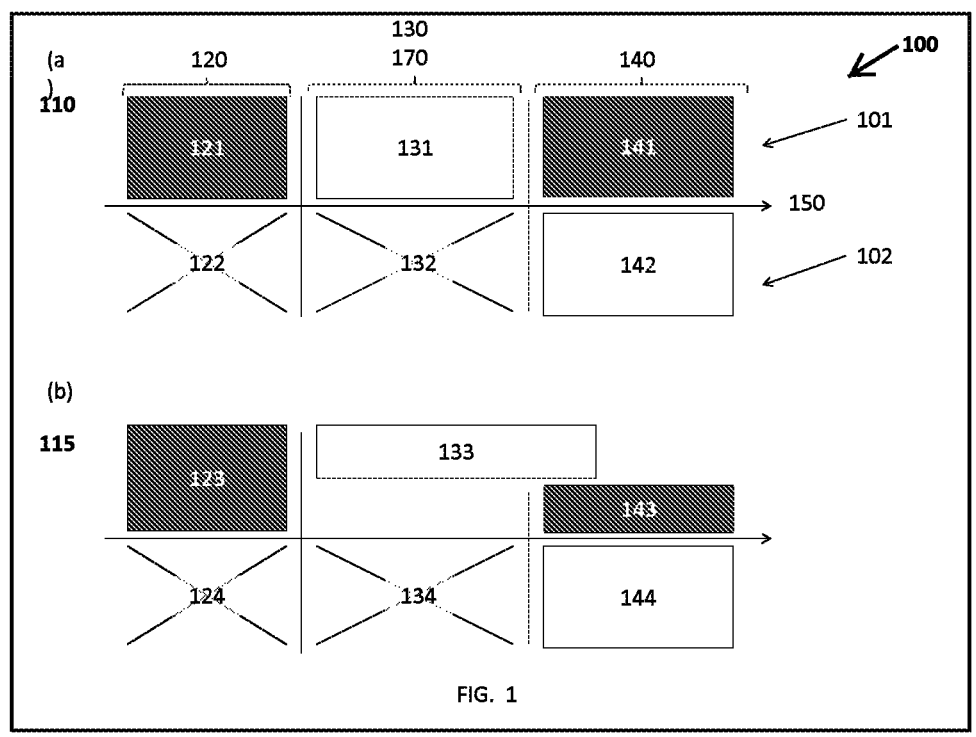
FIG. 1 illustrates possible measurements for determining shaft torque (a) or other than shaft torque parameters (b), useful for condition monitoring of a wind turbine, when the wind turbine is either connected or disconnected to the grid, and as a function of the bandwidth of the measurement processing system, in accordance with the present invention.

Taking into account the fact that load variations act as a superior general condition monitoring parameter of rotating machinery equipment, such as for instance wind turbines, with an ability to detect abnormal loading of drivetrain components and incorrect operation of the electrical control system, a robust, reliable and economically acceptable measurement processing system is proposed with this invention.

The invention relates to systems, methods and related software, enabling analysis, preferably remotely, such as condition monitoring of wind turbines, especially related to fatigue issues. In general, load variations can be monitored, whereas in particular the invention is determined by suitable measuring or monitoring of the shaft torque and its variations of such wind turbines. Even more in particular, the invention is related to enabling measuring of occurrence of shaft torque in both rotation directions of the shaft, in particular also the direction for which the wind turbine is not designed for in its normal operation, also referred to as negative shaft torque.

The condition monitoring of wind turbines according to the present invention can be related to one or more elements of wind turbines. Possibly but not necessarily monitoring is related to the gearbox of the shaft. In case of gearless drivetrain lay-out, an optional embodiment is considered, specifically monitoring shaft torque occurring on the generator rotor.

Further, monitoring of wind turbines according to the present invention, is characterized by determining a condition measure either per shaft element or global for the entire turbine or a group of shaft elements.

The invented systems, methods and related software support a first insight in that the wind turbines, while operable, can be either connected or disconnected to the electrical grid, further referred to as grid. During such connection to the grid, certain measurements on parts of a wind turbine are available, whereas this no longer holds when the wind turbine is disconnected therefrom, as such measurements may become unavailable. However, for the condition monitoring purpose as described above, torque measurements of both situations—connected or disconnected to the grid—are required, and hence measurements on parts of the wind turbine, which are always present (meaning irrespectively of a connection to the grid) must be sought for and installed. Furthermore, systems, methods and related software support developed to deal with both sets of measurements, are desirable.

In an exemplary embodiment of the invention, certain measurements on parts of the wind turbine, available during connection to the grid, are measurements on the electrical parts of the wind turbine, and are further denoted as electrical measurements. These electrical measurements are e.g. voltages and/or currents in the generator.

In another exemplary embodiment of the invention the measurements installed for being always available (irrespectively of the connection to the grid) are measurements on the mechanical parts of the wind turbine, and are further denoted as mechanical measurements. Whereas the mechanical parts are typically rotational mechanical parts, the mechanical measurements are for example angular shaft positions as a function of time. Other considerations that can be made related to the selection of suitable measurements will be discussed later on.

The invention further supports a second insight in that the data transmission and optionally the data processing costs must be kept relatively low, and in that this depends in essence on the data sampling rate, which has to be chosen appropriately for the condition monitoring purpose described above. More in particular it is recognized that the measurements on the mechanical parts of the wind turbine could be interpreted as essentially too good (too high frequent, too high sampling rate, too much detailed), hence continuous use of so-called mechanical measurements during all modes of operation (on or off the grid) of the wind turbine, might not serve the consideration about costs just discussed.

The invention therefore provides a measurement processing system 200 (FIGS. 2 and 5), capable of inputting both measurements performed on one or more electrical parts of the wind turbine and measurements performed on one or more mechanical parts of the wind turbine. As an example according to the invention, considering shaft torque measurement in particular, the electrical part of the wind turbine monitored is the generator. Other measurements on (multiple) other electrical parts are applicable going broader than just shaft torque measurements. The measurement processing system 200 is moreover capable of determining and adapting for available information in order to obtain an output signal with optimal accuracy, i.e. for instance information particularly useful during a specific mode of operation of the wind turbine (on or off the grid), or e.g. related to measurements with the appropriate frequency or sampling rate. With the measurement processing system 200 according to the present invention, it is a purpose to reduce high-frequent measurements (e.g. measurements performed on the mechanical parts) as quickly as possible to a simplified representation. The measurement processing system 200 is further designed to represent a state indicative of whether the wind turbine is connected to the grid or not (irrespectively how such signal is determined as this can be either explicit or implicit). According to the present invention, the measurement processing system 200 is designed for selecting the measurements on the electrical parts when the wind turbine is connected to the grid, whereas other measurements are applicable in case the wind turbine is off the grid. In an embodiment thereof the measurement processing system 200 is provided with a switch 200A for such selection purposes. In a further embodiment the measurement processing system 200 is capable to use the measurements on the mechanical parts as back-up in case doubt about the measurements on the electrical parts are presents, for example due to sensor failures. For this purpose, the measurement processing system 200 typically issues a status warning on such sensor failures.

In an embodiment of the invention each type of the measurements (also denoted channels) has a different and/or adaptable data sampling.

In light of the second insight of the invention, the remote aspect of condition monitoring of wind turbines according to the invention is of particular relevance, because of the fact that data needs to be compressed as quickly as possible.

The invention is further built on a third insight of the monitoring situation today at wind turbines, i.e. the aspect of availability of different signal types representing different quality. Obviously from the measurements currently available to the operator, and further denoted as process signals, rough determining of the torque is also possible. These process signals are for instance electrical power on the grid and the rotational speed of the wind turbine. However, those operator available measurements or process signals are not enough detailed. Even when these process signals are available during on grid state of the turbine, a too low frequency content of the shaft torque is present therein, in order to enable the condition monitoring aimed at.

Therefore in another exemplary embodiment of the invention, the measurements installed for being always available (irrespectively of the connection to the grid) are those considered on the mechanical parts of the wind turbine, also referred to as mechanical measurements, and moreover selected with sufficient detail, i.e. high-frequency signals. An example of such mechanical measurement is e.g. the angular shaft position as a function of time. The rotational speed of the wind turbine however, though it is also a kind of mechanical measurement per se, and typically available as process signal today, does not qualify thereunder.

Therefore the invention provides the use of additional measurements on one or more elements, and more in particular determines the use of those measurements for an appropriate shaft torque estimate, by using a model description of those one or more elements, or combinations thereof. The one or more elements, subject to those additional measurements, are for example the mechanical to electrical energy convertor or generator, and/or the electrical energy convertor or frequency convertor of the wind turbine itself.

Hence in an embodiment of the invention, the (switching) measurement processing system as described above is adapted with computational means or a module, e.g. a computer, for determining a shaft torque estimate by use of a model. Based on the inputted measurements performed on one or more electrical parts of the wind turbine in on-grid state, so-called electrical measurements are defined and may for instance relate electrical components to shaft torque.

In an embodiment of the invention the measurement processing system is designed to handle and use electrical measurements at least up to 150 Hz (while the process signals are typically below 5 Hz), and up to at least 1 kHz for the embodiments wherein specific condition monitoring like Motor Current Signature Analysis (MCSA) of the generator is foreseen.

It is further noted that the wind turbines have on-board control methods, hence performing also measurements or computations, such as shaft torque measurements, and feedback on control settings based thereon. These on-board control methods can be based on various techniques and can e.g. also be model based. However the internals of such on-board control are typically shielded from access, and hence cannot be used for condition monitoring nor are the computations made intended for condition monitoring, but for control purposes instead. As a result, on-board control measurements or computations will also fall under the category of too slow for the purpose described (i.e. too low sampling rate in terms of data handling). The invention provides a solution in that another appropriate model is used, be it in parallel with the control models, in order to determine a shaft torque estimate on in essence the same values of the control measurements. Moreover the invented measurement processing system is preferably made for use on a multitude of wind turbines of various kinds, meaning using many different technologies. Therefore the measurement processing system is provided with means or a module, e.g. a processor, for loading a model suitable for the wind turbine, on which the measurement processing system is particularly used for its condition monitoring. In an embodiment of the invention, it is determined that a model of the combined mechanical to electric energy convertor or generator and the electrical energy convertor or frequency convertor of the wind turbine is preferred, wherein the underlying electro-mechanical equations can be sufficiently simplified to still achieve a shaft torque estimate with a reasonable quality (sufficient dynamics) for the intended purpose. In an embodiment an analytical physical model is used.

The present invention hence relates to the measurement processing system discussed above and also to the overall system of the wind turbine and the measurement processing system connected thereto. The invention further relates to the methods used within the measurement processing system, in particular the methods of switching between one or another measurement source (or channel) for determining a shaft torque estimate—typically based on the situation at hand. In addition, the invention relates to the methods for computing model-based shaft torque estimates (in one specific situation, i.e. on or off grid, and low-medium-high frequency sampling) from measurements on the measurement processing system. The present invention also relates to the methods of loading suitable models on the measurement processing system.

The invention provides use of shaft torque estimates with a selected sampling rate (hence within a particular range) in that the detail—or frequency content—of the shaft torque estimate is higher than what can be determined from classically available operator data or from the on-board control methods, while being lower than what is available from the measurements on the mechanical parts. Building on the above understanding of the needs, a combination of computed shaft torque estimates is provided, based on a suitable model from measurements on the electrical parts when available (i.e. wind turbine on the grid) and shaft torque estimates optimized with respect to their frequency content based on the measurements on the mechanical part, only used when the turbine is no longer on the grid. The switching enables a good economy of the data handling while supporting the fundamental understanding that data of the period that the wind turbine is not connected to the grid—especially in the transition from rotation to sudden stop—is essential for condition monitoring, since then in particular, large oscillations and occurrence of negative shaft torque will appear. As in one embodiment the occurrence of such negative shaft torque peaks is used for condition monitoring.

While referring to on-board control methods, the corresponding systems (further denoted as on-board systems) are typically black box. Hence, the invention also requires to tuning of the control model to be used, based on dedicated measurement campaigns. Nevertheless, according to an embodiment of the invention, in case one or more parameters of the on-board systems are made available, their further use for calibrating the model and/or real-time improving of the model can be foreseen.

While the above suggests separate use of the measurements made on the electrical part and the mechanical part, especially forced by the circumstance of being connected to the grid or not on the one hand, and the economy of data handling on the other hand, according to further embodiments of the invention, temporarily combined use of those for instance for calibrating the model and/or real-time improving the model and/or calibrating the conversion of the measurements on the mechanical part into a shaft torque estimate is provided also. A more quantitative analysis is hence provided. In such embodiments, an even more simple model can be used and/or the accuracy can be improved especially when the electrical measurements lack dynamics.

In an embodiment of the invention the measurement processing system is an electronic system, hence typically comprising one or more PCBs, with thereon (single or double sided) mounted one or more electronic components, being interconnected via the electronic wiring on the PCB's, whereby finally said one or more PCB's are put in a suitable form factor mechanical package or casing. The one or more electronic components define at least a part of the modules, having an identified function. More specifically the modules for inputting measurements will typically have a further mechanical part or connector for connecting the wire used for bringing the sensor measurements to the system. Further the electronic part of such module will then comprise electronic components handling the input interfacing. Alternatively the module for inputting measurements may be adapted for wireless communication and hence may have an antenna used for wireless communicating with the sensors. The electronic part of such module will then additionally comprise of electronic components arranged to act a radio front-end and/or baseband. The computation module again may comprise of one or more electronic components. Electronic components throughout this paragraph can be a dedicated designed unit such ASIC, ASIP, FPGA's or general purpose CPU's or other off the shelf controllers (with programmability features), memory components (such ROM, RAM) used for storage of data (input data, intermediate or final computation results) and/or related soft- or firmware, executed on said units. Specific bus controller and microcontrollers can also be used. Contrary to the modules for inputting measurements or signals, the module for loading a model will have a connector for receiving a typical digital data transmission cable, connectable to a computer or other equipment, for transfer in a suitable electronic format such model. Alternatively the model may be loaded by inserting a memory element (USB stick or other memory card) whereon such model is stored. A similar structure can be used for the module for inputting on-board information.

In conclusion, the present invention provides the necessary hardware and software elements for proper use of shaft torque estimates in condition monitoring, particularly monitoring fatigue, and takes into account the available measurements with their advantages and disadvantages, as well as the use cases of the wind turbine. More in particular, the present invention enables exploiting those advantages while minimizing the disadvantages, by enabling switching therein between. Further, the present invention provides additional elements like a model to bring the measurements to the required, sufficient and hence appropriate accuracy.

DESCRIPTION OF THE DRAWINGS

FIG. 1 illustrates with a wind turbine measurement graph 100 the possible measurements of process signals 120, electrical measurements 130, including conversion model 170, and mechanical measurements 140 for determining shaft torque 110 as depicted in FIG. 1a, or other than shaft torque parameters 115 as shown in FIG. 1b. These measurements 120, 130, 140, including conversion model 170, and particularly resulting shaft torque 110 and its variations, are used for condition monitoring of a wind turbine. As illustrated in FIG. 1, the measurements are all or not available or considered relevant depending on the situation if the wind turbine is either connected 101 or disconnected 102 to the grid. The relevance and availability of the measurements 120, 130, 140, including conversion model 170, is further given as a function of the bandwidth 150 of the measurement processing system. According to FIG. 1, three bandwidth slots can be identified: a low frequency band for which process signals 120, more specifically those when connected to the grid 121, 123 are relevant measures, a mid band for which electrical measurements 130 including the conversion model 170 can be used, again typically when connected to the grid as given by 131, 133, and a high frequency band that is required for the processing of the mechanical measurements 140, especially applicable in case the wind turbine is disconnected 102 from the grid, as depicted by 142, 144. Main measurements to rely on for the condition monitoring are either the electrical measurements 130, 131, 133 including conversion model 170 for mid band frequency situations, whereas for higher accuracy needs high frequency parameters determined from the mechanical measurements 140, 142, 144 are preferred to use. Optionally, and whenever connected to the grid, process signals 121, 123 corresponding with much lower frequencies may be indicative according to specific circumstances, as well as e.g. mechanical measurements 141, 143 for temporal usage. As shown in FIG. 1b, in case considering other than shaft torque parameters 115, electrical measurements 130, 133, including conversion model 170 may also be (partially) applicable for the higher frequency range. The presence of electrical measurements 133 in higher frequency range, as depicted in FIG. 1b, is related to specific condition monitoring like Motor Current Signature Analysis, or MCSA, of the generator, as known in the art.

Figure 2:
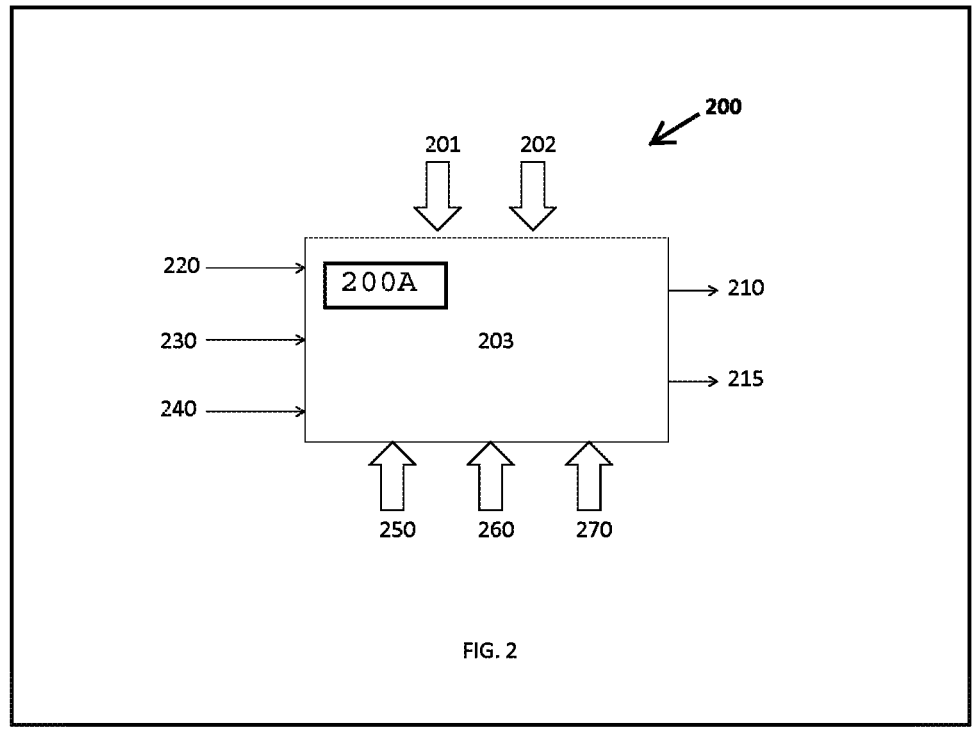
FIG. 2 illustrates the black-box measurement processing system suitable for supporting condition monitoring of a wind turbine, representing input measurements, output parameters and measuring conditions in accordance with the present invention.

In FIG. 2 a schematical black-box representation of measurement processing system 200 suitable for supporting condition monitoring of a wind turbine is depicted. Left from the black-box 203, the input measurements 220, 230, 240 are given, determined respectively by process signals 220, electrical measurements 230 and mechanical measurements 240. Right from the black-box 203, the output parameters, i.e. shaft torque 210 or other than shaft torque parameters 215, are depicted as expected results. While illustrating conditions of the measurement processing system, to be taken into account for achieving the expected outcome, the following are considered: is the wind turbine on 201 or off 202 the electrical grid, what is the measurement performance required 250, what is the measurement availability 260, and what is the conversion model 270 to be applied to the inputted measurements. The aspect of requiring performance is related to the second insight of the invention, i.e. the type of measurement should match the frequency dependency. The availability concerns the third insight of the invention, i.e. what type of measurement is available to be used in a particular circumstance or for a certain required performance.

In accordance with the present invention, FIG. 3 shows a detailed time evolution of the electrical 335, 336, 337 and mechanical measurements 348, including generator shaft torque 310 as a function of time 350 before (a), during (b) and just after (c) the emergency stop of a wind turbine, using high-speed data acquisition of the measured electrical parameters 335, 336, 337 and a strain gauge measurement setup for determining shaft torque 310 on the low speed shaft of the drive train. FIG. 3a shows a continuous pattern of the value for the respective parameters. At the moment of opening of the grid breaker, an instantaneous increase of the current 335 towards the grid is noticed, as illustrated in FIG. 3b. This results in an instantaneous increase of the delivered power 337 of the wind turbine to the grid, causing a slight speed 348 decrease. The voltage 336 is gradually decreasing and extinguishes to zero during the time frame of FIG. 3b. The shaft torque 310 increases significantly in this period, up to a value of about 1.5 times the nominal value, because the generator shows an increased lagging towards the rotation of the drivetrain, due to the retaining torque from the grid. As soon as the circuit breaker is completely opened (after about 200 msec), the power delivered to the grid has fallen back to zero. As depicted further in FIG. 3c, the inertia and torsional stiffness of the drive train cause an oscillation of the shaft torque 310 between the unloaded generator and the rest of the drive train, including a large amount of negative torque cycles. This also causes the speed 348 to oscillate around a slowly decreasing mean value. The oscillating movement eliminates the kinetic energy from the system, up to a moment when the speed 348 will have decreased enough to mechanically stop the shaft train with a brake. This example shows that while the electrical measurements 335, 336, 337 are capable of identifying variations of mechanical loading of the shaft train components in a nominal operation or during transients when the machine is coupled to the grid, such as with wind gusts, they are not capable of identifying actual loads as soon as the unit is decoupled from the grid. The example also shows the complex relation between the electrical power 337, the wind turbine speed 348 and the actual shaft torque 310, in a coupled and uncoupled condition to the grid. Electrical measurements 335, 336, 337 and detailed speed 348 measurements are needed to enable a determination of shaft torque 310 loading in all conditions.

As illustrated in FIG. 4, it is therefore proposed to combine the measurement of angular shaft position variations 440 (derived from pulse train measurements 442) and electrical measurements 430 in a single robust measurement device 405 in order to benefit from the advantages of both techniques and to assure a highly available and generic measurement tool for condition monitoring purposes.

FIG. 4 schematically shows the overall mechanical to electrical energy conversion system 470 of the wind turbine 480 and the measurement processing system 400 connected thereto for condition monitoring of a wind turbine 480 in accordance with the present invention. This FIG. 4 illustrates a setup as used with a shaft train using a DFIG generator 490, in combination with a coupling transformer 495 and a partial-scale power converter 492, representing today's common mechanical to electrical energy conversion technology for wind turbines. The general setup remains however the same with a full converter technology, where no gearbox 485 is present. The difference will then be found in the modelling 170 of the electrical energy conversion chain 470.

Pulse train measurements 442 to determine the angular shaft position variations 440 are used on (in preference) both the high-speed and low-speed shafts in order to determine shaft torque 410 variations over the gearbox 485. The use of two measurements enables a simplified assessment of the shaft torque 410 variations, disregarding local effects in the gearbox 485 teeth. Also a detailed speed measurement can be provided by these pulse train measurements 442, which will improve the accuracy and response time in the calculation of the shaft torque 410, based on electrical measurements 430. This will be particularly interesting when the available process signals 120, 220 that represent the actual load lack dynamic signal content. Electrical measurements 430 are taken at the grid side 433 of the wind turbine (currents and voltages) as well as from the frequency converter circuit 434 (currents). The measurement of both rotor 434 and stator 433 components enables a scaling of load variations towards shaft torque 410, using a simplified modelling of the generator system and its converter. The model 170 of the electrical energy conversion part 470 of the wind turbine system will be dependent of the actual design of the shaft train, and is therefore used as an individual building block in the system. This makes the setup of the system easily upgradeable for future modifications of the electrical part of the drivetrain. The angular shaft position variations 440 and the electrical measurements 430, including conversion model 170, can therefore together generate all the needed parameters for determination the shaft torque 410, independent of the control system 475.

All the measured signals are routed to a shaft torque measurement device 405 that is installed locally in the nacelle or tower of the wind turbine 480. This device 405 samples all the mentioned measurement signals at high speed. This data sampling can be different for the individual channels based on the desired bandwidth and precision, as to optimise the data processing as much as possible.

The electrical measurements 430 are considered to be the most reliable and easiest to implement, both with respect to sensing technology as with respect to data processing. The measurements of angular shaft position variations 440 are available as a backup for shaft torque measurements in a nominal operation. When the electrical measurements 430 are unavailable due to the disconnection of the generator 490 from the grid (e.g. at slow speed or during an emergency stop), the angular shaft position variations 440 continue to assess dynamic torque variations on the shaft train. These variations are scaled with respect to the nominal load based on the electrical measurements 430 in the preceding operation period. This calibration of the angular shaft position variations 440 can be done on a regular basis within the system.

The output of the system is a continuous dynamic voltage signal that is proportional to the shaft torque 410 variation in the drivetrain, and is available in all operating conditions, independent of the control system characteristics and the dynamic content of the available process control signals. This signal can then be used as a condition monitoring parameter in applications focusing on fatigue monitoring. Even if one of the inputs 440, 430 of the shaft torque measurement device 405 fails due to sensor problems, the parallel technique will still be available for a determination of shaft torque 410 variations, be it with the disadvantages of the individual technique. A status warning will be issued by the system, asking for an inspection of the input signals or hardware at a next occasion. A redundancy is thus also incorporated in the system, increasing the availability of the measurement.

The use of a combined device 405 that is installed locally in the nacelle of the wind turbine eliminates the need for high-speed data storage and transfer of large data sets for post processing and off-line data processing of both the angular shaft position variations 440 and the electrical measurements 430. The processing of the measurements towards a shaft torque 410 reading is done in real-time within the measurement device 405.

The used measurement techniques are also more reliable for long term use when compared to strain gauge measurements and can be retrofitted on existing shaft train configurations at an acceptable cost and effort.

Important elements in the system are a simplified yet sufficiently representative model 170 of the electrical energy conversion chain 470, as well as an adequate and flexible high-speed data sampling and real-time data processing of all the signals. The design of these elements determine the balance between the response time of the system and the cost of the components.

Future enhancements can include a parallel calculation of parameters deduced from the electrical parameters. An example is the integration of Motor Current Signature Analysis (MCSA) in the same platform. All the required data inputs and data processing technology are available in the proposed shaft torque measurement device 405. Additional data outputs can be configured to deliver a relevant output.

Figure 5:
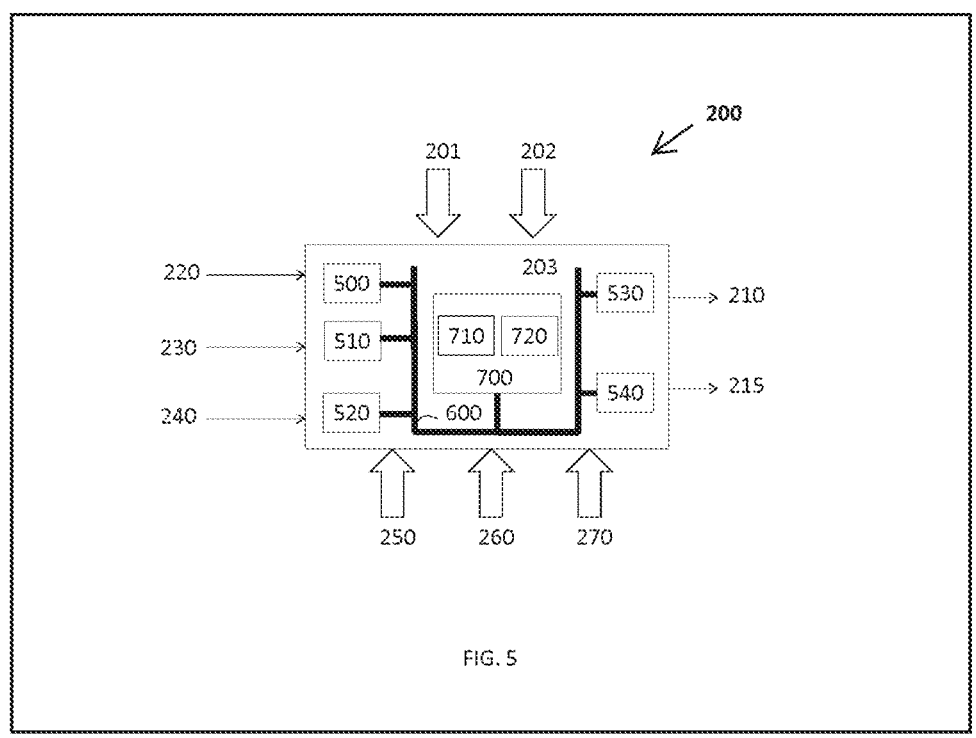
FIG. 5 shows a schematic black-box representation of an embodiment of the measurement processing system suitable for supporting condition monitoring of a wind turbine.

In FIG. 5 a further schematically black-box representation of an embodiment of the measurement processing system 200 suitable for supporting condition monitoring of a wind turbine is depicted. In the example for each of the measurements or inputs or loadings separate modules 500, 510, 520 are suggested. Also for each output separate modules 530, 540 (again comprising electronic and connectors) are suggested. These modules and the computation module 700 (itself having computation unit 710 and memory 720) are connected via a single bus structure 600.

What is claimed is:

1. A measurement processing system suitable for supporting condition monitoring of a wind turbine, comprising: (i) a module for inputting measurements performed on at least one electrical part of the wind turbine when the wind turbine is connected to an electrical grid; (ii) a module for inputting measurements performed on at least one mechanical part of the wind turbine; (iii) a module for determining whether the wind turbine is connected to the electrical grid or not; and (iv) a computation module adapted for determining information representative for shaft torque of the wind turbine and suited for condition monitoring of the wind turbine, based on said measurements and configured to switch between measurements performed on at least one electrical part of the wind turbine when the wind turbine is connected to an electrical grid and measurements performed on at least one mechanical part when the wind turbine is disconnected from the electrical grid; whereby the determining of such information takes into account whether the wind turbine is connected to the electrical grid or not.

2. The measurement processing system of claim 1, wherein said condition monitoring relates to fatigue issues of one or more of the parts of the wind turbine.

3. The measurement processing system of claim 1, further comprising a module for inputting process signals; wherein the computation module further being adapted for using such process signals.

4. The measurement processing system of claim 1, further comprising a module for inputting on-board control information; wherein the computation module further being adapted for using such on-board control information.

5. The measurement processing system of claim 1, wherein the computation module further being adapted for determining shaft torque of the wind turbine from measurements performed on at least one electrical part of the wind turbine by use of an analytical model of at least a part of the wind turbine.

6. The measurement processing system of claim 5, further comprising a module for loading a model suitable for the wind turbine on which the measurement processing system is used.

7. A wind turbine provided with condition monitoring capabilities, comprising: (i) mechanical parts provided with first measurement equipment thereon; (ii) a converting system comprising electrical parts provided with second measurement equipment thereon and connected to said mechanical parts; (iii) a switch; and (iv) a measurement processing system as in claim 1, configured to use the switch to switch between inputting measurements provided by said first measurement equipment when the wind turbine is disconnected from an electrical grid and inputting measurements provided by said second measurement equipment when the wind turbine is connected to the electrical grid.

8. The wind turbine of claim 7, wherein the first measurement equipment being adapted for being operable irrespectively of whether the wind turbine is connected to the electrical grid or not.

9. The wind turbine of claim 7, wherein the first measurement equipment measures angular shaft positions of a wind turbine shaft as a function of time.

10. A method for determining information representative for shaft torque of the wind turbine and suited for condition monitoring of a wind turbine, comprising: (i) determining shaft torque of the wind turbine from measurements performed on a mechanical to electrical energy converting system of the wind turbine by use of an analytical model of at least an electrical part of the wind turbine based on such measurements being available when the wind turbine is connected to an electrical grid; and otherwise when the wind turbine is disconnected from the electrical grid, switching to (ii) determining shaft torque of the wind turbine from measurements performed on at least one of the mechanical parts of the wind turbine.

11. The method of claim 10, wherein the measurements performed on at least one of the mechanical parts of the wind turbine are angular shaft positions of a wind turbine shaft.

12. A computer program product comprising computer-executable instructions for performing the method of claim 10, when the program is run on a computer.

13. A digital data storage medium encoding a machine-executable program of instructions to perform any one of (i) or (ii) of the method of claim 10.

* * * * *